(12) United States Patent
Roelkens et al.

(10) Patent No.: US 8,594,503 B2
(45) Date of Patent: Nov. 26, 2013

(54) METHOD AND SYSTEM FOR MULTIPLEXER WAVEGUIDE COUPLING

(75) Inventors: Gunther Roelkens, Melle (BE); Dries Van Thourhout, Ghent (BE); Roel Baets, Deinze (BE); Gerard Nicolaas van den Hoven, Maria Hoop (NL)

(73) Assignees: IMEC, Leuven (BE); Universiteit Gent, Ghent (BE); Genexis B.V., Eindhoven (NL)

( * ) Notice: Subject to any disclaimer, the term of this patent is extended or adjusted under 35 U.S.C. 154(b) by 453 days.

(21) Appl. No.: 12/594,488

(22) PCT Filed: Apr. 4, 2008

(86) PCT No.: PCT/EP2008/054091
§ 371 (c)(1),
(2), (4) Date: Oct. 2, 2009

(87) PCT Pub. No.: WO2008/122607
PCT Pub. Date: Oct. 16, 2008

(65) Prior Publication Data
US 2010/0119229 A1 May 13, 2010

Related U.S. Application Data

(60) Provisional application No. 60/921,960, filed on Apr. 5, 2007.

(30) Foreign Application Priority Data

Jun. 7, 2007 (EP) ..................... 07075449

(51) Int. Cl.
*H04J 14/02* (2006.01)
*G02B 6/26* (2006.01)

(52) U.S. Cl.
USPC .................. 398/82; 398/79; 398/83; 398/84; 398/87; 385/15; 385/27; 385/31; 385/37; 385/39

(58) Field of Classification Search
USPC .............................. 398/79, 82–87; 385/14–50
See application file for complete search history.

(56) References Cited

U.S. PATENT DOCUMENTS 7,065,272 B2 6/2006 Taillaert et al.
(Continued)

FOREIGN PATENT DOCUMENTS

EP 1 353 200 10/2003
(Continued)

OTHER PUBLICATIONS

Backlund et al: "Multifunctional Grating Couplers for Bidirectional Incoupling into Plannar Waveguides", IEEE Photonics Technology Letters, vol. 12, No. 3, Mar. 2000, pp. 314-316.*
(Continued)

*Primary Examiner* — Li Liu
(74) *Attorney, Agent, or Firm* — McDonnell Boehnen Hulbert & Berghoff LLP

(57) ABSTRACT

An optical device for optically multiplexing or demultiplexing light of different predetermined wavelengths is provided, the optical device comprising at least one first waveguide (11) and at least one second waveguide (12) formed on a substrate (10), wherein the at least one first waveguide and the at least one second waveguide intersect at an intersection, comprising a diffraction grating structure (13) formed at the intersection. There exists a first wavelength or wavelength band travelling within the first waveguide (11) exciting the grating structure and being diffracted at an angle corresponding to an outcoupling direction and there exists a second wavelength or wavelength band, different from the first wavelength or wavelength band, travelling within the second waveguide (12) exciting the grating structure and being diffracted at an angle corresponding to the same outcoupling direction. The two radiation beams comprising radiation of two different wavelengths or wavelength bands are spatially separated into the optical waveguides (11 and 12) or combined into single outcoupling direction, e.g. into a single optical element, e.g. a single optical fiber (21). An optical device may be used in local access communications such as fiber to the home, office or curb applications.

22 Claims, 11 Drawing Sheets

(56) References Cited

U.S. PATENT DOCUMENTS

| | | | |
|---|---|---|---|
| 2002/0008215 A1* | 1/2002 | Evans | 250/559.13 |
| 2002/0126942 A1 | 9/2002 | Evans | |
| 2003/0235370 A1* | 12/2003 | Taillaert et al. | 385/50 |
| 2004/0184156 A1* | 9/2004 | Gunn et al. | 359/629 |
| 2006/0280405 A1 | 12/2006 | Gunn et al. | |

FOREIGN PATENT DOCUMENTS

| | | |
|---|---|---|
| EP | 1 445 632 | 8/2004 |
| WO | WO 02/082134 | 10/2002 |

OTHER PUBLICATIONS

Backlund et al: "Input waveguide grating couplers designed for a desired wavelength and polarization response", Applied Optics, vol. 41, No. 15, May 20, 2002, pp. 2818-2825.*

Bogaerts et al: "A polarization-diversity wavelength duplexer circuit in silicon-on-insulator photonic wires", Optics Express, vol. 15, No. 4, Feb. 12, 2007, pp. 1567-1578.*

Taillaert et al: "Grating Coupler for Coupling between Optical Fibers and Nanophotonic Waveguides", Japanese Journal of Applied Physics, vol. 45, No. 8A, Apr. 2006, pp. 6071-6077.*

Taillaert et al., "Grating Couplers for Coupling Between Optical Fibers and Nanophotonic Waverguides", Japanese Journal of Applied Physics, vol. 45, No. 8A, Apr. 17, 2006, pp. 6071-6077.

Backlund, J. et al., "Input Waveguide Grating Couplers Designed for a Desired Wavelength and Polarization Response", Applied Optics, OSA, Optical Society of America, vol. 41, No. 15, May 20, 2002, p. 2818-2825.

Backlund, Johan et al., "Multifunctional Grating Couplers for Bidirectional Incoupling into Planar Waveguides", IEEE Photonics Technology Letters, vol. 12, No. 3, Mar. 1, 2000, pp. 314-316.

Bogaerts et al., A Compact Polarization-Independent Wavelength Duplexer Using a Polarization-Diversity SOI Photonic Wire Circuit', Optical Fiber Communication Conference, Mar. 25, 2007, pp. 1-3.

Roelkens et al., "Silicon-on-Insulator Ultra Compact Duplexer Based on a Diffractive Grating Structure", Optics Express, vol. 15, No. 16, Jul. 26, 2007, pp. 10091-10096.

* cited by examiner ns (U.S. Pat. No. 7,065,272), which comprises two

METHOD AND SYSTEM FOR MULTIPLEXER WAVEGUIDE COUPLING

FIELD OF THE INVENTION

This invention relates to integrated optical components. More specifically it relates to integrated all-optical dielectric waveguide couplers and integrated wavelength multiplexer and demultiplexer circuits, methods and systems for designing such optical components and methods for coupling radiation between different radiation guides.

BACKGROUND OF THE INVENTION

Photonic integrated circuits hold the potential of creating low cost, compact optical functions. The application fields in which they can be applied are very diverse: telecommunication and data communication applications, sensing, signal processing, etc. These optical circuits comprise different optical elements such as light sources, optical modulators, spatial switches, optical filters, photodetectors, etc., the optical elements being interconnected by optical waveguides.

Optical waveguides are typically implemented as solid dielectric light conductors, which allow to route light over the integrated optical circuit and to interconnect the various optical components integrated on the circuit. They also provide the interfacing between the optical fiber and the optical circuit, typically by physical abutment of the optical fiber to the waveguide. Due to the large difference in mode size between the optical fiber and the integrated optical waveguide, this typically leads to high coupling losses at the coupling interface.

Whereas these coupling losses can be kept within acceptable limits for low refractive index contrast optical waveguides, this is not the case for high refractive index contrast waveguide systems in which the fiber to waveguide coupling losses are in the order of 20 dB. However, these high refractive index contrast optical waveguide systems hold the promise of creating large scale integrated optical circuits providing lower cost and higher functionality compared to the low refractive index contrast integrated circuits.

Therefore, there is a great interest in improving the coupling efficiency between an optical fiber and the optical waveguide circuit. While various optical coupling schemes were originally developed for fiber-chip interfaces, these can also be applied to the optical coupling between an integrated optical waveguide and an integrated opto-electronic device (e.g. light source, modulator, optical amplifier, photodetector). Different technologies are presented in the literature to enhance the coupling efficiency to an optical fiber.

In a first approach, the optical mode of the single mode optical fiber is transformed to a smaller spot-size by using a lensed optical fiber or a high numerical aperture fiber. While these types of coupling interfaces provide lower coupling loss, the sub-micron alignment accuracy required to position the optical fiber with respect to the optical waveguide is very critical and implies therefore a high packaging cost of the integrated optical circuit.

Another approach is to use an integrated spot-size converter to expand the size of the integrated optical waveguide mode to match that of a single mode optical fiber. Both planar spot-size converter approaches and three dimensional spot-size converter approaches are applied. Three dimensional spot-size converters allow low coupling losses between the integrated optical waveguide and a single mode optical fiber, but fabrication of these components using standard planar waveguide technology is difficult. It has been shown that planar spot-size converter approaches allow low coupling losses to a standard single mode optical fiber in a low refractive index contrast material system. However, the use of this spot-size converter approach in high refractive index contrast devices always implies the need of a lensed optical fiber or high numerical aperture optical fiber, again resulting in the requirement of high alignment accuracy.

Moreover, these coupling approaches (physical abutment using standard optical fiber or lensed optical fiber and the use of a spot-size converter) all require a polished facet to couple light into the optical circuit. This excludes its use for wafer scale optical testing of the integrated optical functions to identify the known good dies on a processed wafer.

In order to improve the coupling efficiency to a standard single mode fiber in a high refractive index contrast system, and in order to relax the alignment accuracy of the optical fiber and to allow for wafer scale testing, one-dimensional grating structures have been proposed. These structures allow direct physical abutment from the top or bottom side of the structure with a standard single mode optical fiber, while the diffraction grating directs the light into the optical waveguide circuit. They allow coupling of light of a selected wavelength or wavelength band from a single mode optical fiber to a waveguide or from a waveguide to a single mode optical fiber.

The optical bandwidth of this type of devices is however limited by the dispersive nature of the grating structure, implying that the angle, under which light is coupled out of the grating, when excited from the optical waveguide, changes as a function of wavelength. Due to the limited numerical aperture of the optical fiber, wavelengths that deviate too much from the central wavelength, defined as the wavelength for which the angle of diffraction matches the tilt angle of the optical fiber, are less efficiently collected in the optical fiber.

Moreover, the performance of these one-dimensional gratings is critically dependent on the polarization of the light in the optical waveguide. Typically, only a single polarization state at a certain wavelength can be efficiently collected in the optical fiber, resulting in a very polarization dependent operation of the one-dimensional grating coupler. As in typical applications this polarization is unknown and varying over time, the applicability of the one-dimensional grating structures is limited. Only in the cases where polarization maintaining fiber is used or where a polarization scrambling approach is adopted, these one-dimensional gratings can be used. Also in the case where the one-dimensional grating structure is used to optically couple an integrated light source, generating, processing or detecting light with a known and fixed polarization, these devices can be used.

In order to circumvent the problem of polarization sensitivity, a two-dimensional grating coupler structure has been proposed (U.S. Pat. No. 7,065,272), which comprises two optical waveguides intersecting at a substantially right angle and a two-dimensional diffractive grating structure created at the intersection. When the diffractive grating is physically abutted with a single mode optical fiber, a polarization split is obtained that couples orthogonal modes from the single-mode optical fiber into identical modes in the first and second waveguide. While the ratio of coupled optical power between both optical waveguides is still dependent on the polarization of the incident light, this two-dimensional fiber coupling structure can be used in a polarization diversity approach, in order to achieve a polarization independent integrated circuit.

Besides the fact that fiber to chip coupling efficiencies comparable to the one-dimensional grating structure still have to be demonstrated, for some practical applications the optical bandwidth of the fiber-to-chip coupling efficiency is too small. This limited bandwidth is related to the intrinsic dispersive properties of the diffraction grating and the limited numerical aperture of the optical fiber. Whereas this is sufficient for applications requiring only a single optical wavelength or a set of closely spaced optical wavelengths, this is insufficient for other types of applications where the use of optical signals over a large wavelength span is required. This is typically the case for data communication applications where two different wavelengths, not closely spaced, are used for achieving a bidirectional data link. An important class of applications for which this is the case, is in Fiber-To-The-Home optical networks (FTTH), in which a 1310 nm upstream data signal, a 1490 nm downstream data signal and a 1550 nm downstream television signal are used, transmitted through one single mode fiber. Due to the large wavelength span used in this application the use of a prior art waveguide grating coupler structure is no longer applicable, as its optical bandwidth is too small.

SUMMARY OF THE INVENTION

It is an object of the present invention to provide good methods and systems for all-optically multiplexing and/or demultiplexing radiation of substantially different wavelengths. It is an advantage of embodiments of the present invention that an integrated waveguide coupler and (de)multiplexer is provided based on a diffraction grating structure, the coupler being capable of coupling optical signals over a large wavelength span. The polarization of the light in the dielectric waveguides can be transverse electric, quasi transverse electric, transverse magnetic or quasi transverse magnetic. More specifically the integrated waveguide coupler according to embodiments of the present invention allows coupling of optical signals centered around two distinct wavelengths or wavelength bands, by exploiting the duplexer action of the diffraction grating structure. The grating structure may be a one-dimensional or a two-dimensional structure. In case of a two-dimensional grating structure, a system can be obtained wherein the performance is not sensitive to the polarization of the incident light, such that polarization independent integrated optical circuits may be obtained.

The present invention relates to an optical device for all-optically multiplexing or demultiplexing light of substantially different predetermined wavelengths, to a method for designing such a device and to the use of such a device. Furthermore, the present invention relates to a method for multiplexing or demultiplexing light of substantially different predetermined wavelengths.

In the context of this invention, the terms "radiation" and "light" are used for indicating electromagnetic radiation with a wavelength in a suitable range, i.e. electromagnetic radiation with a wavelength that is not absorbed by the materials used (e.g. the waveguide material), for example electromagnetic radiation with a wavelength between 1 μm and 2 μm, e.g. near infrared radiation (NIR) or short wavelength infrared radiation (SWIR).

In the context of the present invention, the term "all-optical" device refers to an optical device that does not require switching back to the electrical domain. An all-optical device therefore may allow optical-to-optical signal conversion, without the need for intermediate switching back to the electrical domain.

In the context of this invention, it is advantageous that the polarization of the light in the dielectric waveguides can be transverse electric, quasi transverse electric, transverse magnetic or quasi transverse magnetic. In photonic integrated circuits, the light used in the dielectric waveguides may be polarized (quasi) transverse electric (TE). Integrated lasers emit TE light. TE polarized light or quasi TE polarized light experiences lower losses in the dielectric waveguides, and the effective index contrast is larger for transverse electric (TE) polarized radiation than for transverse magnetic (TM), resulting in higher confinement (shorter bends, lower cross talk, etc.)

The incident light can be polarized transverse electric or transverse magnetic, in the case of a one-dimensional grating. The grating can then be optimized either to perform optimal for TE or TM polarization or quasi TE or TM polarization. In case of a 2D grating, a system can be obtained wherein the performance is not sensitive to the polarization of the incident light, such that polarization independent integrated optical circuits can be obtained.

An optical device for all-optically multiplexing or demultiplexing light of substantially different predetermined wavelengths according to embodiments of the present invention comprises at least one first dielectric waveguide and at least one second dielectric waveguide formed on a substrate, the at least one first dielectric waveguide and the at least one second dielectric waveguide intersecting at an intersection, and a diffraction grating structure formed at the intersection. In embodiments according to the present invention, the diffraction grating structure is adapted for diffracting light of a first predetermined wavelength from the at least one first dielectric waveguide in a coupling direction, and for diffracting light of a second predetermined wavelength from the at least one second dielectric waveguide in substantially the same coupling direction, the first predetermined wavelength and the second predetermined wavelength being substantially different. The coupling direction thereby is substantially different from the normal direction on the average plane defined by the grating structure. The difference between the first predetermined wavelength and the second predetermined wavelength may for example be between 20 nm and 500 nm. The diffraction grating structure being adapted for diffracting light of a first predetermined wavelength from the at least one first dielectric waveguide in a coupling direction, and for diffracting light of a second predetermined wavelength from the at least one second dielectric waveguide in substantially the same coupling direction, may comprise the diffraction grating structure having at least one predetermined grating period, grating depth, grating layer thickness or grating duty cycle. The light in the at least one first dielectric waveguide and the light in the at least one second dielectric waveguide can be polarized (quasi) transverse electrically or (quasi) transverse magnetically. The incident light or outcoupling radiation can be polarized transverse electrically, transverse magnetically or both. This is advantageous in view of the applicability of the invention: the light of integrated lasers is mainly polarized (quasi) transversally electric. This light travels as TE polarized or quasi TE polarized light in the dielectric waveguides. Moreover, TE polarized light or quasi TE polarized light experiences lower scattering losses and a higher effective refractive index contrast allowing for example smaller bends and lower cross talk.

The optical device according to embodiments of the present invention may further comprise an optical coupling element coupled with the intersection, the optical coupling element providing an optical path in the coupling direction such that light of the first predetermined wavelength is coupled between the at least one first dielectric waveguide and the optical coupling element and such that light of the second predetermined wavelength is coupled between the at least one second dielectric waveguide and the optical coupling element. The optical coupling element may comprise for example an optical fiber or an optical waveguide. The optical coupling element may for example be coupled with said intersection by physical abutment.

In embodiments of the present invention, the at least one first dielectric waveguide may comprise one first dielectric waveguide and the at least one second dielectric waveguide may comprise one second dielectric waveguide. The one first dielectric waveguide and the one second dielectric waveguide may thereby intersect substantially under a straight angle.

The diffraction grating structure may be a one-dimensional grating structure.

In another embodiment according to the present invention, the at least one first dielectric waveguide may comprise two first dielectric waveguides, and the optical device may be adapted for coupling light of the first predetermined wavelength incident on the diffraction grating structure from the coupling direction as orthogonally polarized optical modes to each of the two first dielectric waveguides, the light having the same single mode in each of the two first dielectric waveguides. Furthermore, the at least one second dielectric waveguide may comprise two second dielectric waveguides, and the optical device may be adapted for coupling light of the second predetermined wavelength incident on the diffraction grating structure from the coupling direction as orthogonally polarized optical modes to each of the two second dielectric waveguides, the light having the same single mode in each of the two second dielectric waveguides.

At least one of the at least one first dielectric waveguide and the at least one second dielectric waveguide may be adapted for supporting TE polarized light or quasi TE polarized light. The diffraction grating structure may be a periodic grating structure or a non-periodic grating structure, for example made of a pattern of elliptically shaped structures.

The diffraction grating structure may be a two-dimensional grating structure.

In embodiments according to the present invention, the at least one first dielectric waveguide and the at least one second dielectric waveguide may be for example channel waveguides, slab waveguides, ridge waveguides or strip loaded waveguides. The diffraction grating structure may be a periodic grating structure or a non-periodic grating structure.

In embodiments according to the present invention, the substrate may comprise an additional stack of layers forming a substrate reflector under the diffraction grating structure.

The at least one first dielectric waveguide may comprise a first lateral spot-size converter and/or the at least one second dielectric waveguide may comprise a second lateral spot-size converter, the first lateral spot-size converter and the second lateral spot-size converter coupling the optical device to one or more integrated optical circuits.

The present invention is furthermore related to a method for manufacturing an optical device for optically multiplexing or demultiplexing light of substantially different predetermined wavelengths. The multiplexing may be duplexing. The method for manufacturing according to embodiments of the present invention comprises forming at least one first dielectric waveguide and at least one second dielectric waveguide on a substrate, the at least one first dielectric waveguide and the at least one second dielectric waveguide intersecting at an intersection, and forming a diffraction grating structure at the intersection, wherein the diffraction grating structure is adapted for diffracting light of a first predetermined wavelength form the at least one first dielectric waveguide in a coupling direction, and for diffracting light of a second dielectric waveguide in substantially the same outcoupling direction, the first predetermined wavelength and the second predetermined wavelength being substantially different. The same coupling direction is substantially different from the normal direction on the average plane defined by the grating structure. In embodiments according to the present invention, the diffraction grating structure may be adapted to couple light in the coupling direction by adapting at least one of the grating period, the grating depth, the grating layer thickness and the grating duty cycle.

The method for manufacturing an optical device according to embodiments of the present invention may furthermore comprise coupling an optical coupling element with the intersection and orienting the optical coupling element with respect to the diffraction grating structure so as to provide an optical path in the coupling direction, such that light of the first predetermined wavelength is coupled between the at least one first dielectric waveguide and the optical coupling element and light of the second predetermined wavelength is coupled between the at least one second dielectric waveguide and the optical coupling element.

The method for manufacturing an optical device according to embodiments of the present invention may further comprise providing in the substrate an additional stack of layers forming a substrate reflector underneath the diffraction grating structure.

The present invention is furthermore related to a method for designing an optical device for optically multiplexing or demultiplexing light of substantially different predetermined wavelengths. A method for designing an optical device in accordance with embodiments of the present invention comprises: determining a direction at which light of a first predetermined wavelength is diffracted from a first dielectric waveguide by a diffraction grating, for a range of diffraction gratings having different grating structures; determining a direction at which light of a second predetermined wavelength is diffracted form a second dielectric waveguide by said diffraction grating, for said range of diffraction gratings having different diffraction grating structures, the second predetermined wavelength being substantially different from the first predetermined wavelength; and selecting a grating structure for which the diffraction of light of the first predetermined wavelength from the first dielectric waveguide occurs in a coupling direction and diffraction of light of the second predetermined wavelength from the second dielectric waveguide occurs in substantially the same coupling direction. The coupling direction thereby is substantially different from the normal direction on the average plane defined by the grating structure. Selecting the grating structure may comprise selecting at least one of the grating period, the grating depth, the grating layer thickness and the grating duty cycle.

The present invention also relates to a computer program product for executing a method for designing an optical device according to embodiments of the present invention, to a machine readable data storage device storing the computer program product, and to the transmission of the computer program product over a local or wide area telecommunications network.

The present invention is furthermore related to a method for optical multiplexing or demultiplexing, the method comprising: providing at least one first dielectric waveguide and at least one second dielectric waveguide on a substrate, the at least one first dielectric waveguide and the at least one second dielectric waveguide intersecting at an intersection; providing a diffraction grating structure at the intersection; diffracting light of a first predetermined wavelength at the diffraction grating structure; and diffracting light of a second predetermined wavelength at the diffraction grating structure, the second predetermined wavelength being substantially different from the first predetermined wavelength, wherein the diffraction grating structure is adapted for diffracting light of the first predetermined wavelength from the at least one first dielectric waveguide in a coupling direction, and for diffracting light of the second predetermined wavelength from the at least one second dielectric waveguide in substantially the same coupling direction. The outcoupling direction is selected substantially different from the normal direction to the average plane defined by the grating structure. Adapting the diffraction grating structure may comprise adapting at least one of the grating period, the grating depth, the grating layer thickness and the grating duty cycle.

In embodiments according to the present invention, the method for optical multiplexing or demultiplexing may further comprise coupling an optical coupling element with the intersection, the optical coupling element providing an optical path in the coupling direction.

In accordance with embodiments of the present invention, providing at least one first dielectric waveguide may comprise providing one first dielectric waveguide, and providing at least one second dielectric waveguide may comprise providing one second dielectric waveguide. The one first dielectric waveguide and the one second dielectric waveguide may intersect substantially under a straight angle.

In accordance with embodiments of the present invention, providing at least one first dielectric waveguide may comprise providing two first dielectric waveguides, and diffracting light of a first predetermined wavelength at the diffraction grating structure may comprise coupling light of the first predetermined wavelength as orthogonally polarized optical modes to each of the two first dielectric waveguides, the light for example having the same single mode in each of the two first dielectric waveguides. Providing the at least one second dielectric waveguide may comprise providing two second dielectric waveguides, and diffracting light of a second predetermined wavelength at the diffraction grating structure may comprise coupling light of the second predetermined wavelength as orthogonally polarized optical modes to each of the two second dielectric waveguides, the light for example having the same single mode in each of the two second dielectric waveguides.

The optical device for optically multiplexing or demultiplexing light of substantially different predetermined wavelengths according to embodiments of the present invention may for example be used in applications whereby the first predetermined wavelength is between 1250 nm and 1350 nm and whereby the second predetermined wavelength is between 1455 nm and 1605 nm.

The optical device for optically multiplexing or demultiplexing light of substantially different predetermined wavelengths according to embodiments of the present invention may be used in local access communications such as for example fiber to the home, office or curb applications.

The subject matter regarded as invention is particularly pointed out and distinctively claimed in the claim section concluding this document. The invention however, both as to organization and method of operation, together with features and advantages thereof, may best be understood by reference to the following detailed description when read with the accompanying drawings.

BRIEF DESCRIPTION OF THE DRAWINGS

In FIG. 10a, a configuration is shown in which the optical circuit processing or generating the wavelength band for which no polarization diversity is implemented, is a two-terminal device connecting to the corresponding dielectric waveguides of both identical three-terminal duplexer devices. In FIG. 10b, a configuration is shown in which the optical circuit processing or generating the wavelength band for which no polarization diversity is implemented, is a one-terminal device connecting to one dielectric waveguide of one of the identical three-terminal duplexer devices.

DETAILED DESCRIPTION OF THE INVENTION

Figure 1:
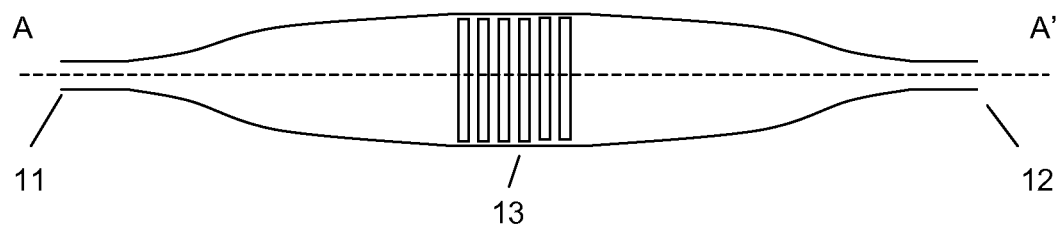
FIG. 1 is a schematic drawing of the optical device according to a first embodiment of the present invention, the device comprising two intersecting optical dielectric waveguides forming a substantially straight angle, and a one-dimensional diffraction grating at the intersection.

In the following detailed description, numerous specific details are set forth in order to provide a thorough understanding of the invention and how it may be practiced in particular embodiments. However it will be understood that the present invention may be practiced without these specific details. In other instances, well-known methods, procedures and techniques have not been described in detail, so as not to obscure the present invention. While the present invention will be described with respect to particular embodiments and with reference to certain drawings, the reference is not limited hereto. The drawings included and described herein are schematic and are not limiting the scope of the invention. It is also noted that in the drawings, the size of some elements may be exaggerated and, therefore, not drawn to scale for illustrative purposes.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

In the context of this invention, a grating is an optical device comprising a pattern of grooves, channels or cavities or holes. If the pattern is in one direction only, the grating is called a linear or a one-dimensional grating. If the pattern is in two directions, e.g. two orthogonal directions, it is referred to as a two-dimensional grating.

In the context of this invention, the terms "radiation" and "light" are used for indicating electromagnetic radiation with a wavelength in a suitable range, i.e. electromagnetic radiation with a wavelength that is not absorbed by the materials used (e.g. the waveguide material), for example electromagnetic radiation with a wavelength between 1 μm and 2 μm, e.g. near infrared radiation (NIR) or short wavelength infrared radiation (SWIR).

It is to be noticed that the present invention can be used both for coupling out radiation of different wavelengths from different dielectric waveguides on a device to a predetermined outcoupling direction, e.g. to an optical coupling element, as well as coupling in, e.g. from an optical coupling element, a radiation beam comprising radiation of different wavelengths to radiation of a predetermined wavelength or wavelength band in different dielectric waveguides on the device. In other words, where in the present application coupling direction is used, this may refer to an outcoupling direction and/or this may refer to an incoupling direction.

Figure 2A:
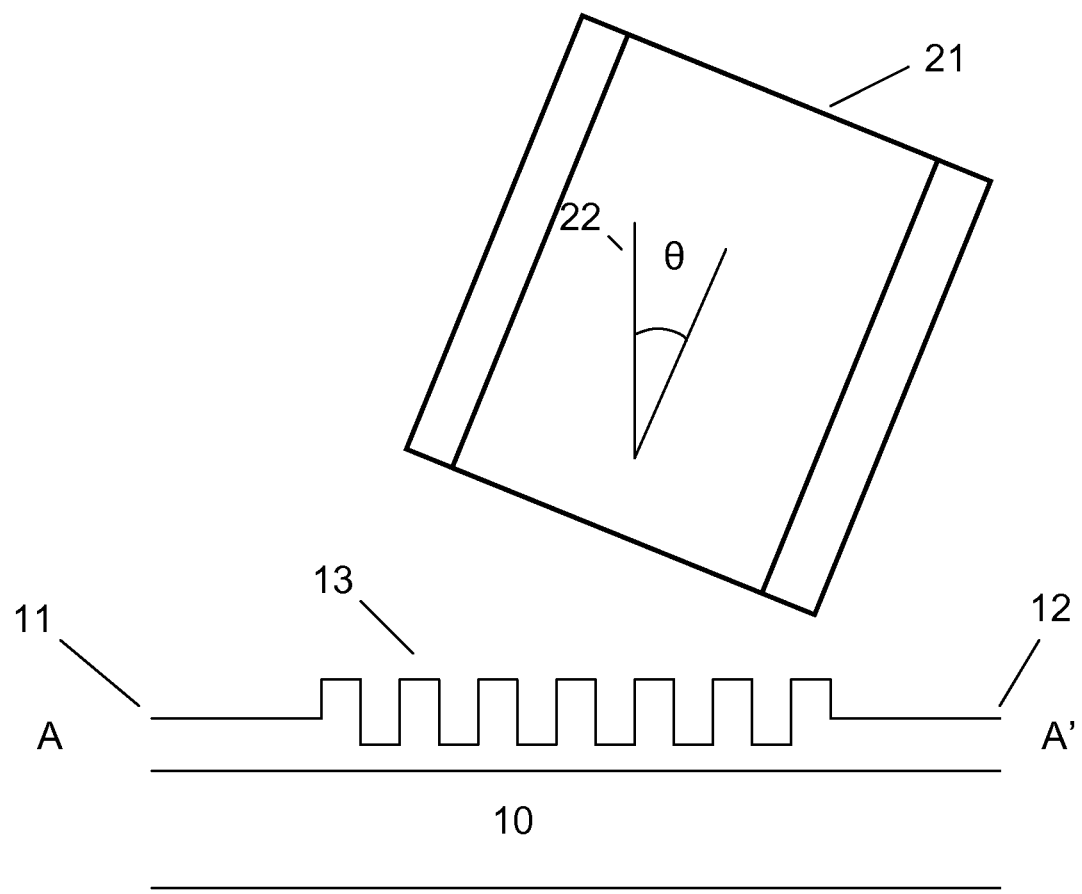
FIG. 2a is a cross-section along line AA' of the device shown in FIG. 1, showing the diffraction grating structure and the physical abutment of an optical fiber, which is tilted with respect to the orthogonal to the average plane of the grating structure.
Figure 2B:
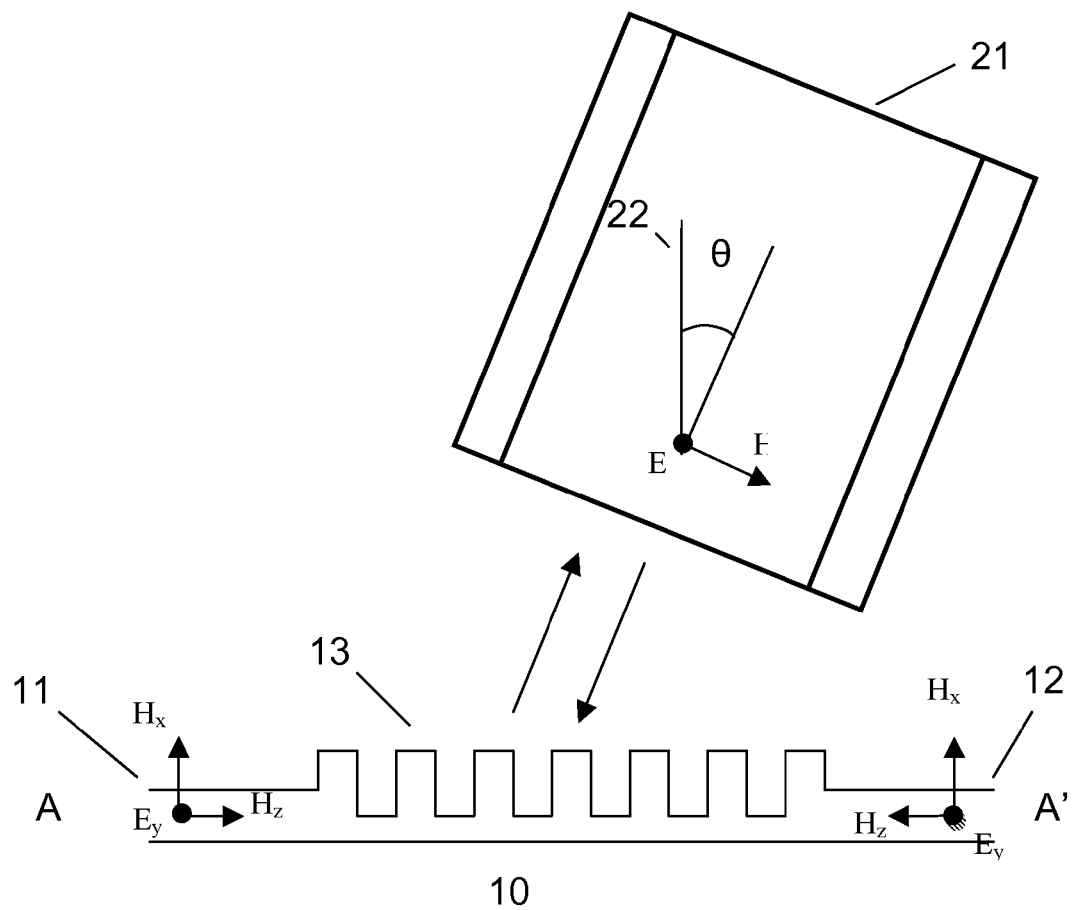
FIG. 2b is a cross-section along line AA' of the device shown in FIG. 1 showing the propagation of TE polarized radiation or quasi TE polarized radiation in such a system.

In a first embodiment, shown in FIGS. 1, 2a and 2b, the optical device in accordance with the present invention comprises a first dielectric waveguide 11 and a second dielectric waveguide 12 on a substrate 10, for example intersecting under a substantially straight angle, and a diffraction grating structure 13 at the intersection of both dielectric waveguides, such as for example a one-dimensional diffraction grating structure. Due to the dispersive properties of the grating structure, there exists a first wavelength or wavelength band for which radiation of that first wavelength traveling within the first dielectric waveguide 11 and exciting the grating structure is diffracted at an angle corresponding to an coupling direction and there exists a second wavelength or wavelength band, different from the first wavelength or wavelength band, for which radiation of that second wavelength traveling within the second dielectric waveguide 12 and exciting the grating structure is diffracted at an angle corresponding to the same coupling direction. The device thus allows to intentionally couple out radiation from a first dielectric waveguide and a second dielectric waveguide into a same coupling direction. The coupling direction according to embodiments of the present invention thereby is substantially different from perpendicular to the plane defined by the two dielectric waveguides, for example substantially different from perpendicular to the average plane determined by the grating structure or in other words substantially different from the surface normal of the average plane determined by the grating structure. Used in this way, the grating structure provides besides fiber to chip coupling also duplexer operation, as two radiation beams comprising radiation of two substantially different wavelengths or wavelength bands are spatially separated into the dielectric optical waveguides 11 and 12 or combined into a single coupling direction, e.g. into a single optical coupling element, e.g. a single optical fiber 21. Also operation comprising a combination of both upstream and downstream wavelengths in one or both dielectric waveguides is possible. The difference between the first wavelength, i.e. the central wavelength of the first radiation beam and the second wavelength, i.e. the central wavelength of the second radiation beam, may for example be in the range between 20 nm and 500 nm. The minimal difference between the first wavelength and the second wavelength is determined by the crosstalk that can be tolerated in the system and by the width of the coupling spectrum (e.g. shown in FIG. 3), which is determined by the refractive index contrast of the system. The maximum difference between the first wavelength and the second wavelength is for example dependent on the dispersion properties of the grating structure.

The coupling direction for radiation comprising radiation of a predetermined central wavelength is determined by the specific layout of the dielectric waveguide structure, e.g. the materials used, the layout of the grating structure, i.e. the grating period, the grating depth or grating layer thickness and the duty cycle of the grating structure.

An optical coupling element, such as for example an optical fiber (21 in FIG. 2a), may be coupled to the intersection (in the coupling direction) to provide an optical path for the radiation coupled in or out. The optical dielectric waveguides 11, 12 may taper from single mode dielectric waveguide structures to a dielectric waveguide width that matches the width of the optical coupling element, e.g. optical fiber 21, coupled with the intersection and providing an optical path for the light coupled in or out. Other optical coupling elements that may be coupled to the intersection are for example another dielectric waveguide or an integrated optical device, such as for example a double photodetector structure, wherein one photodetector detects radiation in one wavelength band, while being substantially insensitive for radiation in the second wavelength band, and wherein the second photodetector detects radiation in the second wavelength band. Also the combination of a light emitting device emitting radiation in one wavelength band and a photodetector for detecting an other wavelength band may be used. Embodiments according to the present invention thereby are particularly advantageous as these allow the use of TE or quasi TE polarized radiation in the dielectric waveguides. The device according to embodiments of the present invention may be adapted for optically multiplexing or demultiplexing of TE polarized radiation or quasi TE polarized radiation, e.g. TE polarized light or quasi TE polarized light. Although the diffraction grating structure is presented in FIGS. 1, 2a and 2b as a periodic structure, also non-periodic grating structures may be used, e.g. to improve the coupling efficiency with the optical coupling element by a better matching of the diffracted field profile with e.g. the Gaussian beam of an optical fiber, as is well known. Instead of lines with a constant width, even other structural shapes than lines may be used to define the diffraction grating structure, in order to improve the coupling efficiency with the optical coupling element, e.g. optical fiber 21. The spacing, size and shape of the features composing the diffraction grating structure may vary throughout the entire structure. The diffraction grating structure may be formed by etching the waveguide layer or the cladding layer or by creating e.g. a dielectric or metallic structured layer on top of the optical waveguide circuit.

FIG. 2a shows the cross-section of the device of FIG. 1 along line AA', with an optical fiber 21 coupled to the intersection. The optical fiber 21 is tilted with respect to the orthogonal 22 to the average plane of the grating structure as indicated in FIG. 2a. This tilting of the optical fiber has two purposes. The first purpose is to reduce the large second order reflection of light in the optical dielectric waveguide, which reduces the fiber coupling efficiency, and the second purpose is to provide an optical path in the same coupling direction for both wavelengths or for both wavelength bands as described above. A cross-section of the device of FIG. 1 along line AA' with corresponding propagation vectors for the propagation of TE polarized radiation or quasi TE polarized radiation is shown in FIG. 2b.

The structure shown in FIGS. 1, 2a and 2b allows spatially separating two wavelengths or wavelength bands into two separate optical dielectric waveguides 11, 12, thereby effectively extending the optical bandwidth of the fiber coupling structure as compared to prior art approaches.

Figure 3:
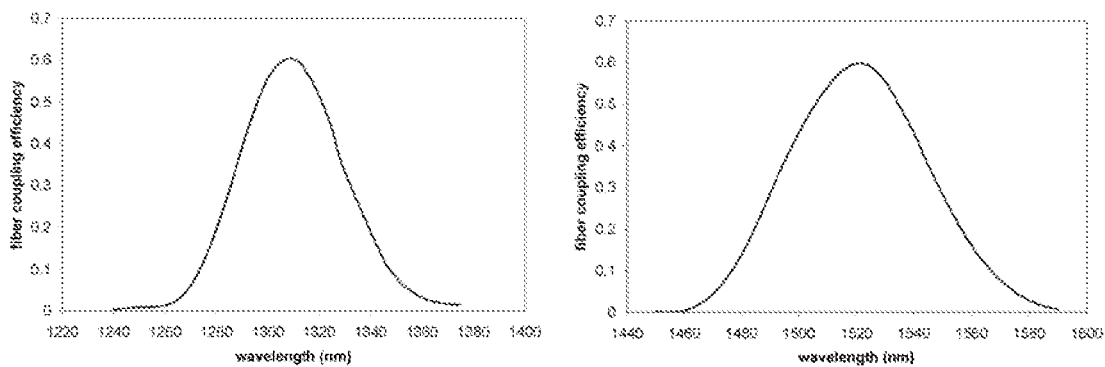
FIG. 3 is a simulation result obtained by an electromagnetic solver for a one-dimensional grating coupler structure, showing the spatial separation of the wavelength bands in both dielectric waveguides and showing that a high coupling efficiency to an optical fiber can be obtained, as can be used in embodiments according to the present invention.

In FIG. 3, a simulation result obtained by a rigorous electromagnetic solver, i.e. a solver exactly solving the Maxwell equations, for a grating coupler structure as described above is shown. In the present example, the light in the dielectric waveguides is (quasi) transversally electrically polarized, as is in most of the cases in integrated optics. The fiber coupling efficiency is shown as a function of the wavelength of the incident radiation for radiation of the first wavelength or wavelength band (FIG. 3, left hand side) and for radiation of the second wavelength or wavelength band (FIG. 3, right hand side). The coupling efficiency is defined as the fraction of the optical power in the optical fiber that is coupled into the dielectric waveguide. By reciprocity, this is also the fraction of power that can be coupled from the dielectric waveguide into the optical fiber. In the example given, the grating structure is designed in a high index contrast Silicon-on-Insulator (SOI) dielectric waveguide structure, although this design can be easily transferred to other high refractive index contrast systems. The SOI waveguide structure used in the simulation comprises a 220 nm silicon core layer on top of a 2 µm thick buried oxide layer. The grating consists of a 370 nm silicon layer, etched 220 nm deep, and it has a grating period of 510 nm and a duty cycle of 50%. The grating consists of 20 grating periods. The central wavelength of the first wavelength band is 1310 nm and the central wavelength of the second wavelength band is 1520 nm. The central wavelength is defined as the wavelength for which the angle of diffraction matches the tilt angle of the optical fiber. The simulations (FIG. 3) show that a high fiber coupling efficiency (about 60%) can be obtained for both radiation beams, which is already sufficient for several applications, such as for example for Fiber To The Home applications. Duplexing operation at 1310 nm-1520 nm is important for Fiber-To-The-Home optical networks in which these wavelength bands are used for upstream and downstream optical data signals. Although this is an important application, other wavelengths or wavelength bands may be selected depending on the application. The central wavelength of the radiation beams may be for example in the range between 1 µm and 2 µm. The difference between the first wavelength, i.e. the central wavelength of the first radiation beam and the second wavelength, i.e. the central wavelength of the second radiation beam, may for example be in the range between 20 nm and 500 nm.

Figure 4:
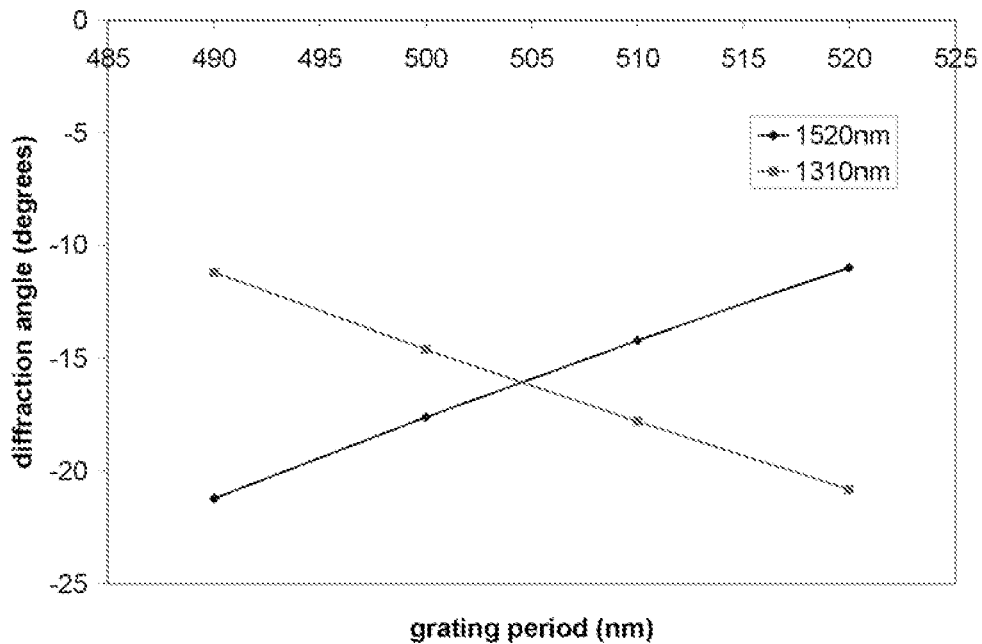
FIG. 4 shows the diffraction angle, calculated as a function of the grating period of a one dimensional grating structure for two different wavelengths (1310 nm and 1520 nm), illustrating the design method for a multiplexer waveguide coupler according to embodiments of the present invention.
Figure 5:
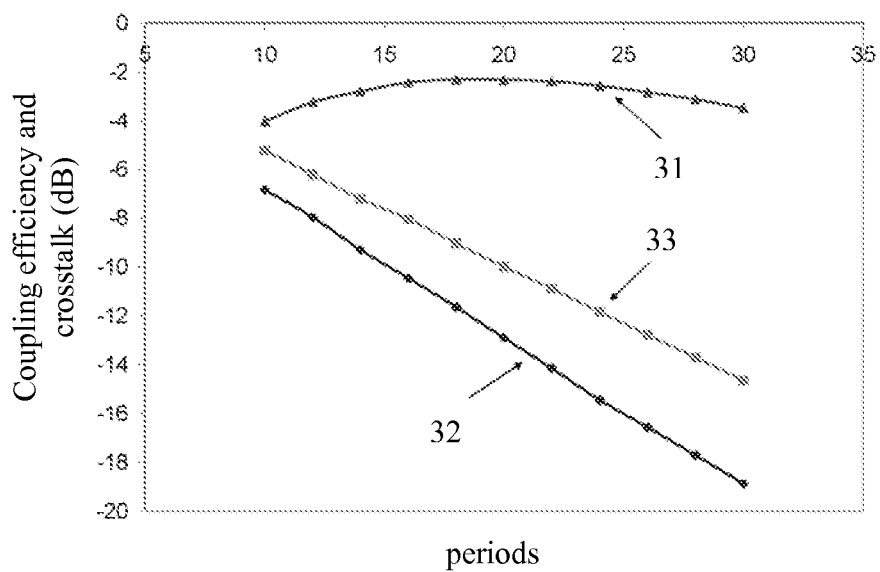
FIG. 5 shows the coupling efficiency and the crosstalk for two different wavelength channels (1310 nm and 1520 nm) as a function of the number of grating periods for a one dimensional grating structure, as can be used in embodiments according to the present invention.

A method for designing an optical device for optically multiplexing or demultiplexing light of substantially different predetermined wavelengths according to embodiments of the present invention is provided. A first step in the method for designing an optical device for optically multiplexing or demultiplexing light according to embodiments of the present invention may be the selection of the grating depth and the duty cycle of the grating. The grating depth and the duty cycle may be selected based on the requirement of a maximum coupling efficiency or may be limited or determined by available etch processes. A next step in the design method comprises determining a direction at which light of a first predetermined wavelength is diffracted from a first dielectric waveguide 11 by a diffraction grating 13, for a range of diffraction gratings having different grating structures, and determining a direction at which light of a second predetermined wavelength is diffracted from a second dielectric waveguide 12 by a diffraction grating 13 for the same range of diffraction gratings having different diffraction grating structures. In embodiments according to the present invention the first predetermined wavelength and the second predetermined wavelength may be substantially different, e.g. the difference between the first predetermined wavelength and the second predetermined wavelength may be between 20 nm and 500 nm. The first wavelength and the second wavelength may be determined by the application envisaged. For example, the first wavelength may be 1310 nm and the second wavelength may be 1520 nm. The materials used for the dielectric waveguide structure may be for example Silicon on Insulator (SOI) with a 220 nm thick dielectric waveguide layer. In a next step of the design method a grating structure may be selected for which the diffraction of light of the first predetermined wavelength from the first dielectric waveguide 11 and the diffraction of light of the second predetermined wavelength from the second dielectric waveguide 12 occur in substantially the same coupling direction. Selecting such a grating structure may for example comprise selecting the grating period, for a given grating depth and duty cycle. This is illustrated in FIG. 4, showing the diffraction angle as a function of the grating period for two wavelengths (1310 nm and 1520 nm). The grating period to be selected for the design of the optical device according to embodiments of the present invention is determined by the point where both curves are crossing. In a next step of the design, the number of grating periods may be determined, for example based on considerations related to the coupling efficiency for both wavelengths and crosstalk between both dielectric waveguides. The influence of the number of grating periods on coupling efficiency and on crosstalk for the example given is illustrated in FIG. 5, indicating the average fiber coupling efficiency 31 (triangles), the crosstalk in the exemplary 1310 nm wavelength channel 32 (diamonds) and the crosstalk in the exemplary 1520 nm wavelength channel 33 (squares).

The simulations of FIG. 3 show that a high fiber coupling efficiency can be obtained for both radiation beams. While these simulations were performed for TE polarization or quasi TE polarization, the behavior of the same coupling structure is completely different for the TM polarized modes. In general, the coupling efficiency between e.g. an optical fiber and a dielectric waveguide is polarization dependent. For example, the coupling efficiency for TE polarized modes or quasi TE polarized modes may be substantially larger than for TM polarized modes. The coupling from an optical fiber to a dielectric waveguide is more efficient if the radiation beam is linearly polarized in a direction substantially perpendicular to the central axis (e.g. line A-A' in FIG. 1) of the dielectric waveguide.

In order to apply the multiplexer waveguide coupler described above in a structure in which the polarization of the light in the optical coupling element, e.g. optical fiber 21, is unknown or varying in time, a micro-optic structure (e.g. polarization splitter) can be positioned between the optical coupling element and the integrated waveguide circuit, to spatially separate both orthogonal polarizations and to focus the optical beams onto two identical (although 90 degrees rotated with respect to each other) one-dimensional grating coupler structures, to achieve polarization independent operation of the integrated optical circuit. In the case where the polarization of the incoming light beam is fixed and known, a one-dimensional grating structure can be used.

In embodiments according to the present invention, a two-dimensional grating structure may be used, allowing splitting of a radiation beam into two orthogonally polarized modes, e.g. a (quasi) TE mode and a (quasi) TM mode, whereby these two orthogonally polarized modes propagate through two different dielectric waveguides, as for example described in U.S. Pat. No. 7,065,272. In some embodiments according to the present invention, a two-dimensional diffraction grating structure may also be used for spatially separating two radiation beams having radiation of two substantially different wavelengths or wavelength bands in different optical waveguides.

Figure 6:
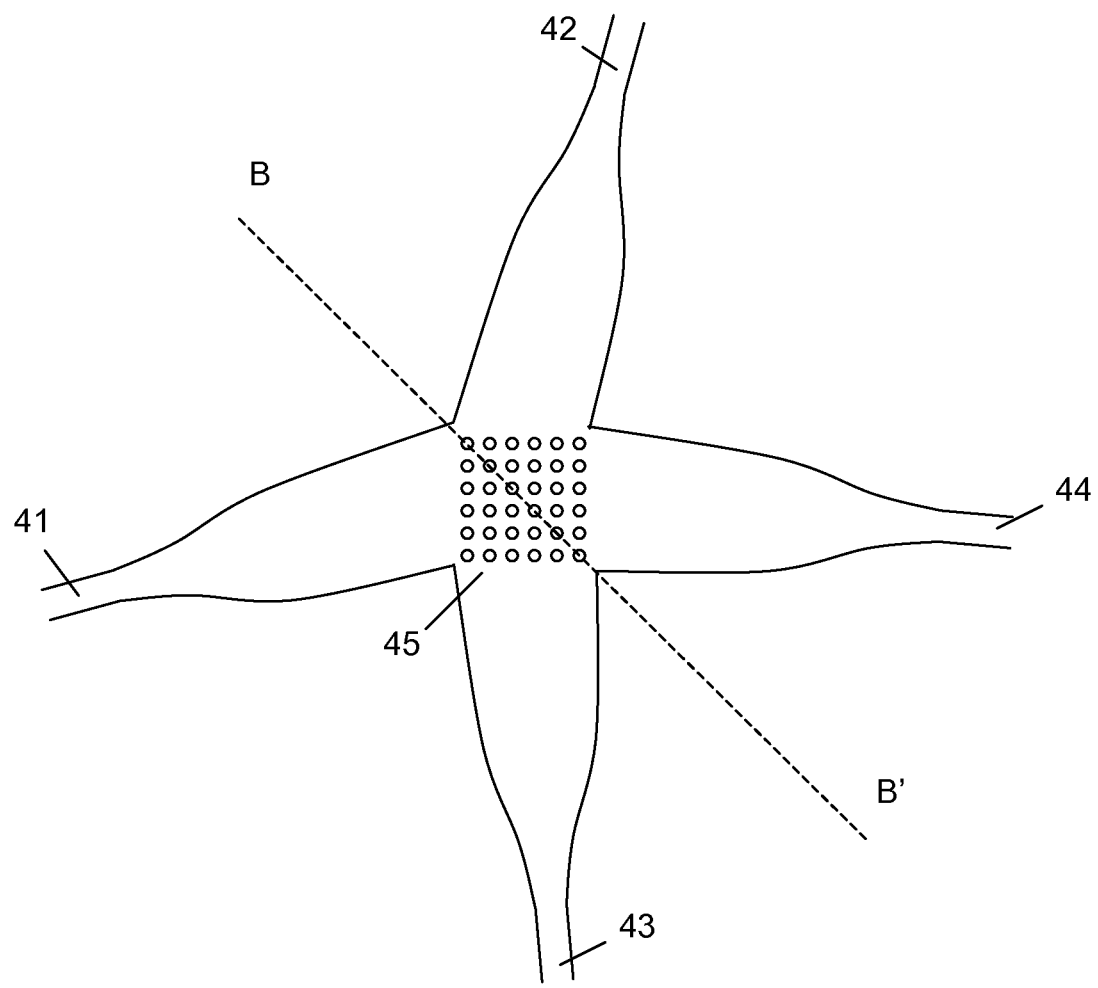
FIG. 6 is a schematic drawing of a second embodiment of the optical device according to the present invention, the device comprising four intersecting optical dielectric waveguides forming a substantially right angle, and a two-dimensional grating coupler structure at the intersection.

In a second embodiment according to the present invention, the polarization issue is tackled by using a two-dimensional diffraction grating structure as a coupler and multiplexer. FIG. 6 shows the layout of this embodiment, comprising 4 dielectric optical waveguides 41, 42, 43, 44 which intersect and which form a substantially right angle at the intersection. At the intersection of the 4 waveguides, a two-dimensional grating structure 45 is provided. The latter may be formed in any suitable way, for example by etching an array of holes or rods in the waveguide layer or in the waveguide cladding layer at the intersection or by defining e.g. a dielectric or metallic structured layer on top of the waveguide structure. Although FIG. 6 shows a periodic arrangement of holes, which define the two-dimensional grating structures, also non-periodic structures with composing elements other than holes may be used, i.e. the spacing, size and shape of the features composing the diffraction grating structure may vary throughout the entire structure.

The approach shown in FIG. 6 allows achieving spatial separation of two wavelengths or wavelength bands into the four optical dielectric waveguides 41, 42, 43, 44, while a polarization split is obtained over two pairs of dielectric waveguides (41, 42) and (43, 44). The waveguide structure is assumed to be symmetric with respect to the line BB' (FIG. 6), thereby identifying the dielectric waveguide pairs in which the polarizations for a same wavelength or wavelength band are split, namely dielectric waveguide pair (41,42) and dielectric waveguide pair (43,44). The optical fiber or other optical element providing an optical path for the coupled light is placed above the two-dimensional grating structure 45 and is tilted with respect to the orthogonal 22 to the average plane of the grating structure along the line BB'. The angle between both dielectric waveguides in a pair is equal to or close to 90 degrees, although for device optimization the angle preferably is different from 90 degrees, e.g. between 70 degrees and 110 degrees. In a configuration wherein the optical coupling element, e.g. optical fiber 21 is not tilted with respect to the orthogonal 22 to the average plane of the grating structure, the angle between two dielectric waveguides in a pair would be identical to 90 degrees for obtaining a polarization split. However, as tilting of the optical coupling element, e.g. optical fiber 21 with respect to the orthogonal 22 to the average plane of the grating structure is done for obtaining duplexer operation, also the angle between two dielectric waveguides in a pair is preferably slightly different from 90 degrees in order to have good coupling efficiency. In this way, for example a high coupling efficiency to the fundamental mode of the dielectric optical waveguide can be obtained when the two-dimensional grating structure is physically abutted by a tilted single mode optical fiber. This can be seen in FIG. 6, where the angle between dielectric optical waveguides 41 and 42 is larger than 90 degrees and the angle between dielectric optical waveguides 43 and 44 is smaller than 90 degrees. The waveguide structure is symmetric with respect to the line BB'. The dispersive nature of the two-dimensional grating structure allows spatially separating two wavelengths or wavelength bands in both pairs of optical dielectric waveguides. These wavelengths or wavelength bands determine, for a specific layout of the dielectric waveguide structure (e.g. the materials used), the layout of the grating structure comprising e.g. the grating period, the grating etch depth or grating layer thickness and the duty cycle of the grating structure, and the tilt of the optical coupling element, e.g. optical fiber 21. The design of the grating structure may be done according to the design method described above.

Used in this way (FIG. 6), the grating structure 45 provides besides fiber to chip coupling also duplexer operation, as two wavelengths or wavelength bands are spatially separated into the optical dielectric waveguides or combined into e.g. a single optical fiber. Moreover, a polarization split of the two orthogonally polarized modes into both dielectric waveguides of a waveguide pair is obtained, and this for both wavelengths or for both wavelength bands. When applied in a polarization diversity scheme, as will be discussed below, this allows to create an integrated optical circuit in a high refractive index contrast waveguide system behaving independent of the polarization of the incident light and allowing to process optical signals centered around two distinct wavelengths or wavelength bands using the duplexer operation of the grating structure.

Figure 7:
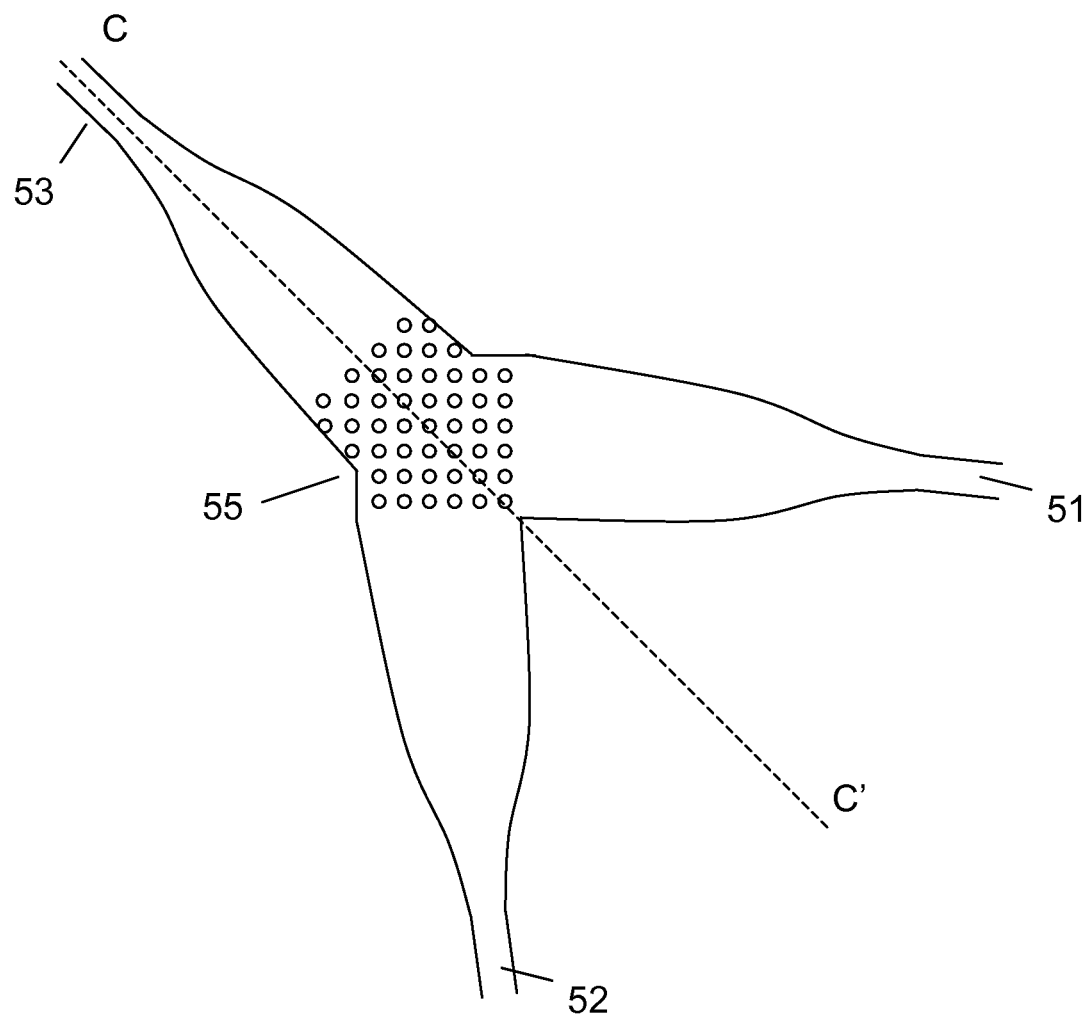
FIG. 7 is a schematic drawing of an example layout for a third embodiment of the optical device according to the present invention. The layout of this embodiment comprises three optical dielectric waveguides, two of which form a substantially right angle while the third dielectric waveguide lies along the bisection line of these two dielectric waveguides. A two-dimensional grating structure is formed at the intersection of the dielectric waveguides.

In a third embodiment according to the present invention, the polarization issue is tackled for a single wavelength or wavelength band by using a two-dimensional grating structure as a duplexer. An exemplary layout of this embodiment is shown in FIG. 7, comprising three optical dielectric waveguides 51, 52, 53, two of which (51, 52) form a substantially right angle, while the third dielectric waveguide 53 lies along the bisection line CC' of the two former dielectric waveguides 51, 52. At the intersection of the dielectric waveguides, a two-dimensional grating structure 55 is formed, for example by etching an array of holes or rods in the waveguide layer or in the waveguide cladding layer or by defining e.g. a dielectric or metallic structured layer on top of the waveguide structure. Although FIG. 7 shows a periodic arrangement of holes, which define the two-dimensional grating structures, also non-periodic structures with composing elements other than holes may be used, i.e. the spacing, size and shape of the features composing the diffraction grating structure 55 may vary throughout the entire structure. One illustration thereof may for example be the use of axially symmetric structures such as for example elliptically shaped holes, oval shaped holes, holes having only one axis of symmetry in their plane, etc.

Figure 8:
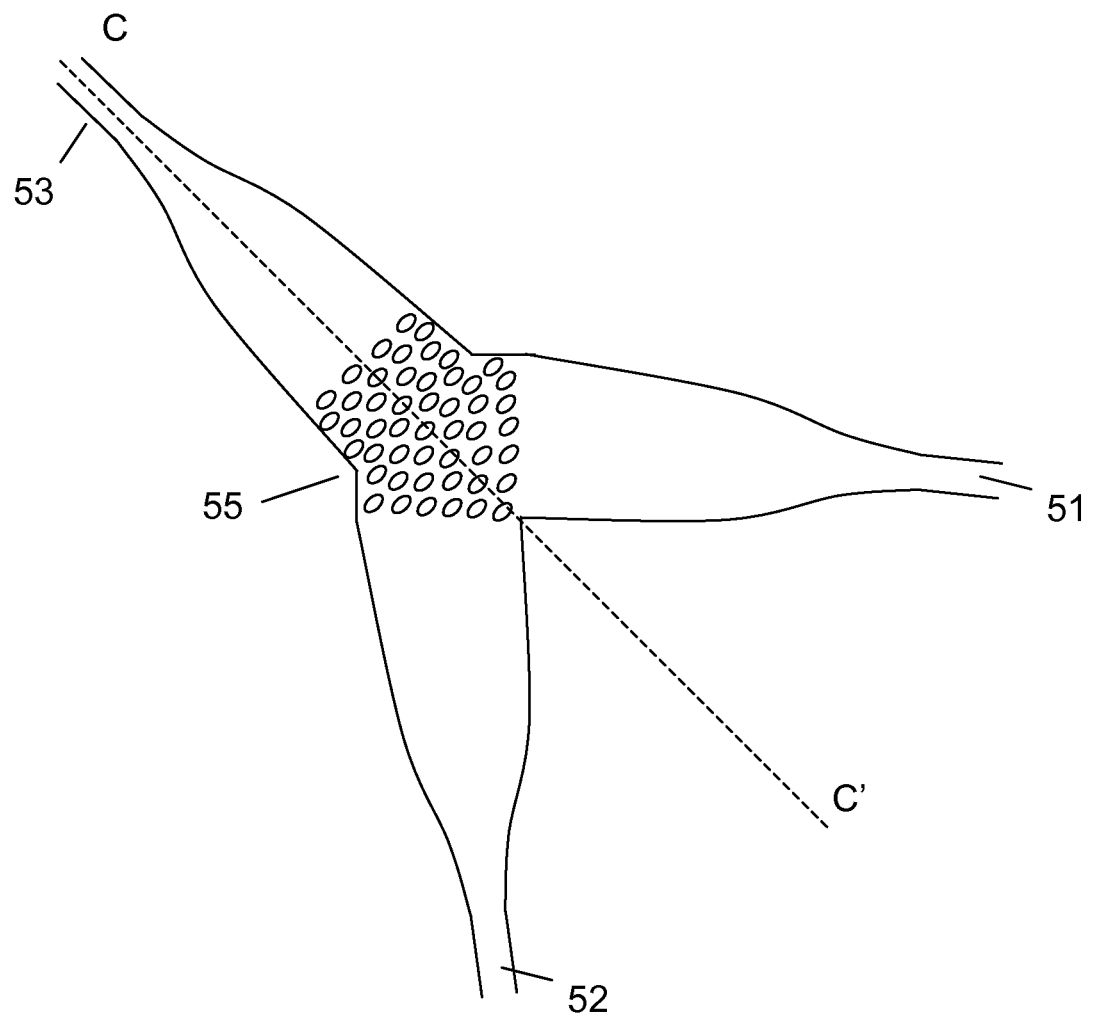
FIG. 8 is a schematic representation of a layout as shown in FIG. 7, indicating a grating structure that may be used in embodiments according to the present invention, wherein the features of the grating structure are elliptically shaped holes.

A particularly interesting embodiment of the structure described above is to use elliptically shaped holes throughout the grating. This allows achieving a larger wavelength range over which effective polarization diversity can be achieved. Making the holes elliptical compensates for the difference in effective grating dimensions that are experienced by both orthogonal polarization states due to the tilting of the optical fiber. In FIG. 8, the use of elliptical holes in a specific grating duplexer configuration is illustrated. The use of these elliptical holes is however not restricted to this specific embodiment of the grating duplexer. It may be advantageous to provide holes that at least have an axially symmetric shape, elliptically shaped holes, oval shaped holes, holes having only one axis of symmetry in their plane, etc. being some examples thereof. Using axially symmetrically shaped holes may provide at least part of the advantages of compensating for the difference in effective grating dimensions that are experienced by both orthogonal polarization states due to tilting of the optical fibre.

The approach shown in FIG. 7 allows to spatially separate two wavelengths or wavelength bands into the three dielectric waveguides 51, 52, 53, wherein for the first radiation beam comprising radiation of a first wavelength or wavelength band a polarization split is obtained into identical modes in the two dielectric waveguides 51, 52 forming a substantially right angle and wherein the second radiation beam comprising radiation of a second wavelength or wavelength band is sent into the third dielectric waveguide 53. This approach allows achieving polarization independent operation for a single wavelength or wavelength band, while strong polarization selectivity is obtained for the second wavelength or wavelength band.

Compared to the two-dimensional diffraction grating structure 45 in the four-terminal device (FIG. 6), the two-dimensional diffraction grating structure 55 in the three-terminal device (FIG. 7) may have additional grating features or less grating features for achieving a high coupling efficiency for all three optical dielectric waveguides 51, 52, 53. Especially the topography and the amount of structures comprised in the diffraction grating structure 55 may be different when compared to the diffraction grating structure 45 of the four-terminal device. The waveguide structure of the three-terminal device (FIG. 7) is assumed to be symmetric with respect to the line CC', thereby identifying the dielectric waveguide pair in which the orthogonal polarizations for a same wavelength or wavelength band are split, namely dielectric waveguide pair (51, 52) in FIG. 7.

The optical fiber 21 (or other optical element providing an optical path for the coupled light) is placed above the two-dimensional grating structure 55 and is tilted with respect to the orthogonal 22 to the average plane of the grating structure along the line CC'. The angle between dielectric waveguides 51 and 52 is equal to or close to 90 degrees, although for device optimization the angle preferably is different from 90 degrees, e.g. between 70 degrees and 110 degrees. This deviation from 90 degrees is e.g. needed to obtain a high coupling efficiency to the fundamental mode of the optical dielectric waveguide when the two-dimensional grating structure is physically abutted by a tilted single mode optical fiber.

Again, it is the dispersive nature of the two-dimensional grating structure 55 that allows spatially separating two wavelengths or wavelength bands. These wavelengths or wavelength bands determine, for a specific layout of the waveguide structure (e.g. the materials used), the layout of the grating structure (i.e. the grating period, the grating etch depth or grating layer thickness and the duty cycle of the grating structure) and the tilt of the optical coupling element, e.g. optical fiber 21. Designing the grating structure 55 may be done according to the design method described above. Used in this way, the grating structure 55 provides besides fiber to chip coupling also duplexer operation, as two wavelengths or wavelength bands are spatially separated into the optical dielectric waveguides or combined into e.g. a single optical fiber. Moreover, a polarization split of the two orthogonally polarized modes into dielectric waveguides 51 and 52 is obtained, and this for a single wavelength or wavelength band. For the other wavelength or wavelength band, the coupling is still polarization dependent. When applied in a polarization diversity scheme, as will be discussed below, this approach allows to create an integrated optical circuit in a high refractive index contrast waveguide system that behaves independent of the polarization of the incident light for optical signals in one wavelength band, and to process optical signals centered around two distinct wavelengths due to the duplexer operation of the grating structure.

The direction of the propagation of radiation in the optical dielectric waveguides 11, 12, 41, 42, 43, 44, 51, 52, 53 and optical coupling device such as e.g. optical fiber or integrated opto-electronic device can be reversed for each wavelength within either wavelength band, due to the reciprocity of the waveguide structure.

While in the discussion above, only the structural properties of the diffraction grating structures and the associated optical dielectric waveguides is described in a simple waveguide structure, more complex layer structures may be used, for example structures comprising a reflection means, e.g. reflection structure such as for example a distributed Bragg reflector (DBR) or a metallic mirror underneath the diffraction grating structure 13, 45, 55. The use of a reflection means allows to increase the coupling efficiency to the optical fiber, as the light that is diffracted towards the substrate, when excited with the optical waveguide mode from either dielectric waveguide, is redirected upwards due to the reflection at the bottom DBR or metallic mirror. Also anti-reflective layers in between the optical fiber and the optical dielectric waveguide structure may be used. Top side anti-reflective layers may be used to achieve destructive interference of the downwards diffracted light, through the interference of the directly downwards diffracted light and the partial reflection of the directly upwards diffracted light.

The optical devices in accordance with embodiments of the present invention, allowing achieving fiber-to-waveguide coupling and duplexer operation, combined with the possibility for polarization independent operation for one wavelength or wavelength band or for two wavelengths or wavelength bands, may be used in a variety of configurations.

Figure 9:
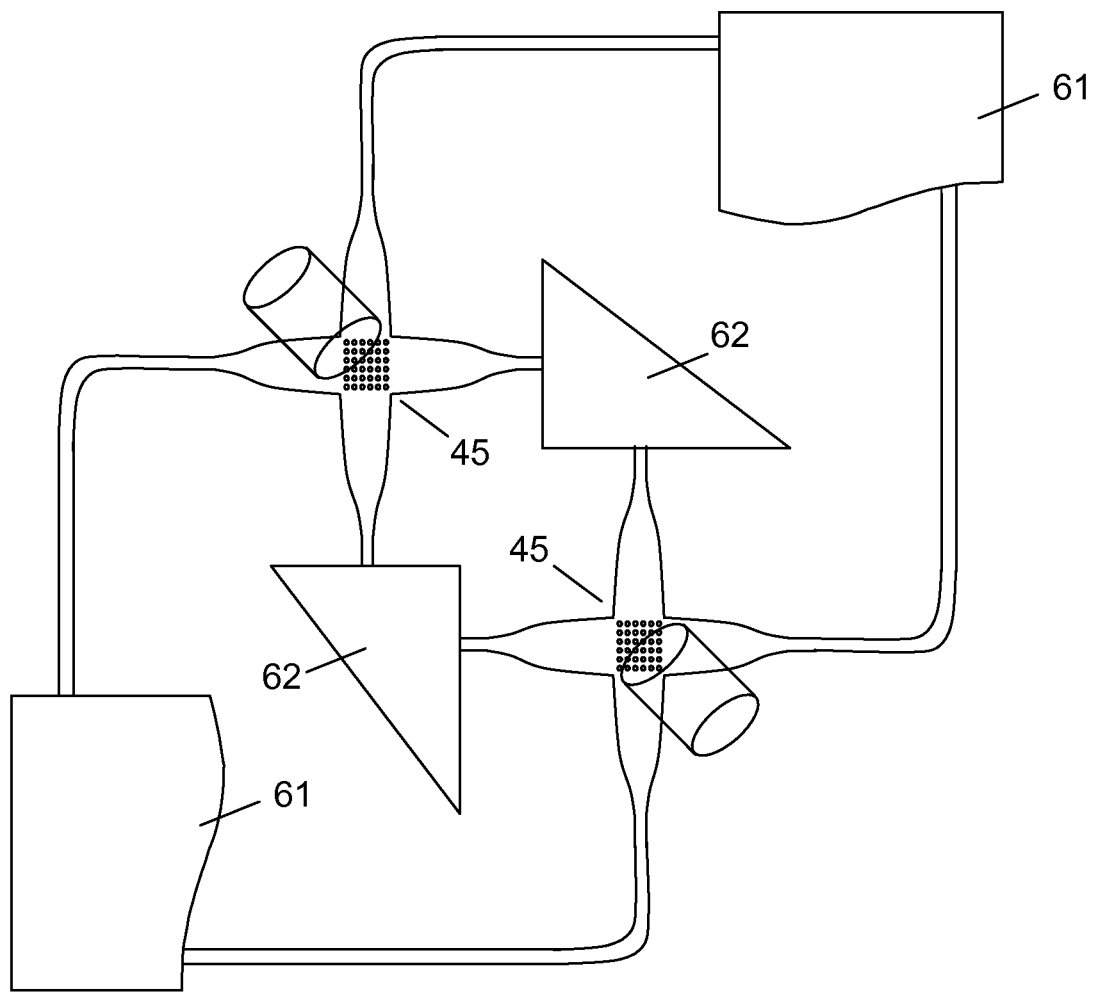
FIG. 9 is a schematic drawing of a possible topology for using the four-terminal device to obtain a polarization independent integrated optical circuit operating around two distinct wavelength bands.

The device comprising four dielectric waveguides, which can also be referred to as four-terminal device (FIG. 6), may be used to obtain a polarization independent integrated optical circuit operating around two distinct wavelengths or wavelength bands when applied in the configuration as shown in FIG. 9. In this example, two identical four-terminal optical devices according to embodiments of the present invention are used for fiber incoupling and outcoupling, while two optical circuits 61, 62 are required, one to process each wavelength or wavelength band. Such optical circuits may be for example wavelength filters with integrated detector array or a light source such as for example a laser source. These circuits are then duplicated and interconnected, an example thereof shown in FIG. 9. As the light propagating in both dielectric waveguides of a dielectric waveguide pair (as defined above) constitutes the same polarization, due to the polarization splitting action of the duplexer fiber-to-waveguide grating coupler, polarization independent operation can be obtained as the duplicated waveguide circuits act identically on the incident radiation.

Figure 10A:
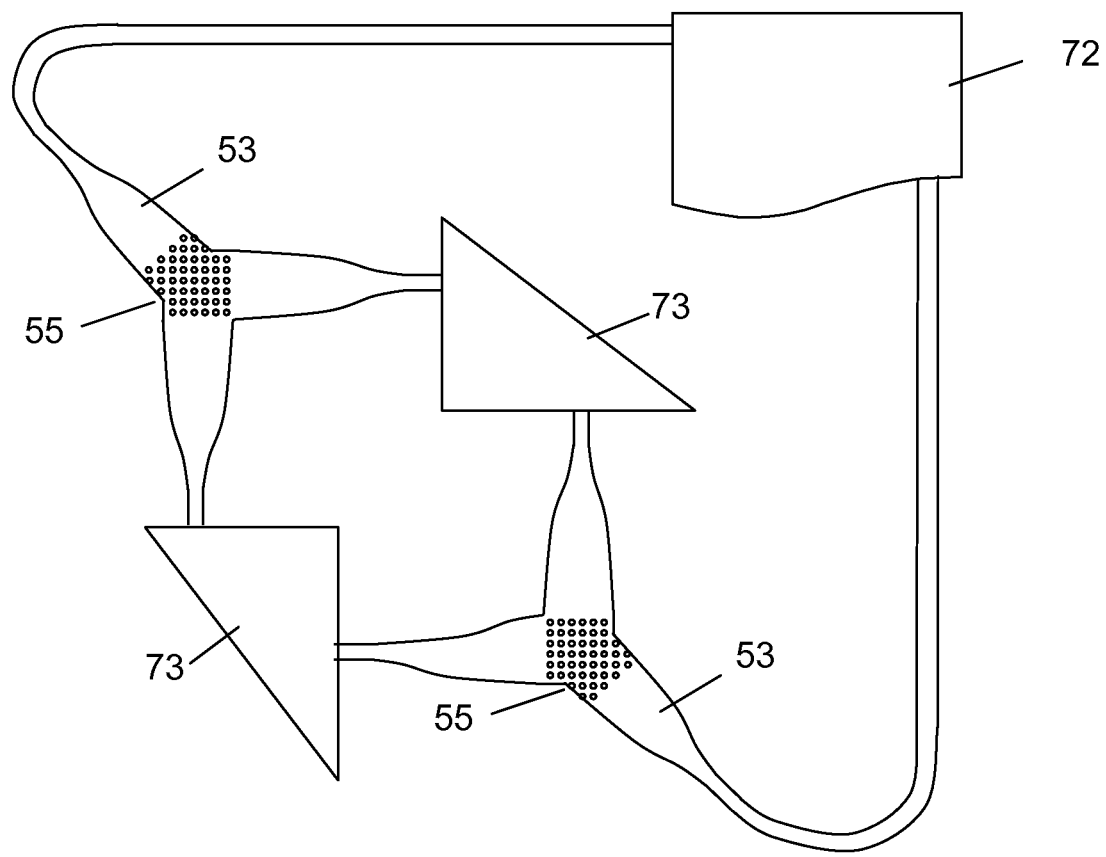
FIGS. 10a and 10b are schematic drawings of possible topologies for using the three-terminal device, in which only for a single wavelength band a polarization diversity configuration is applied.
Figure 10B:
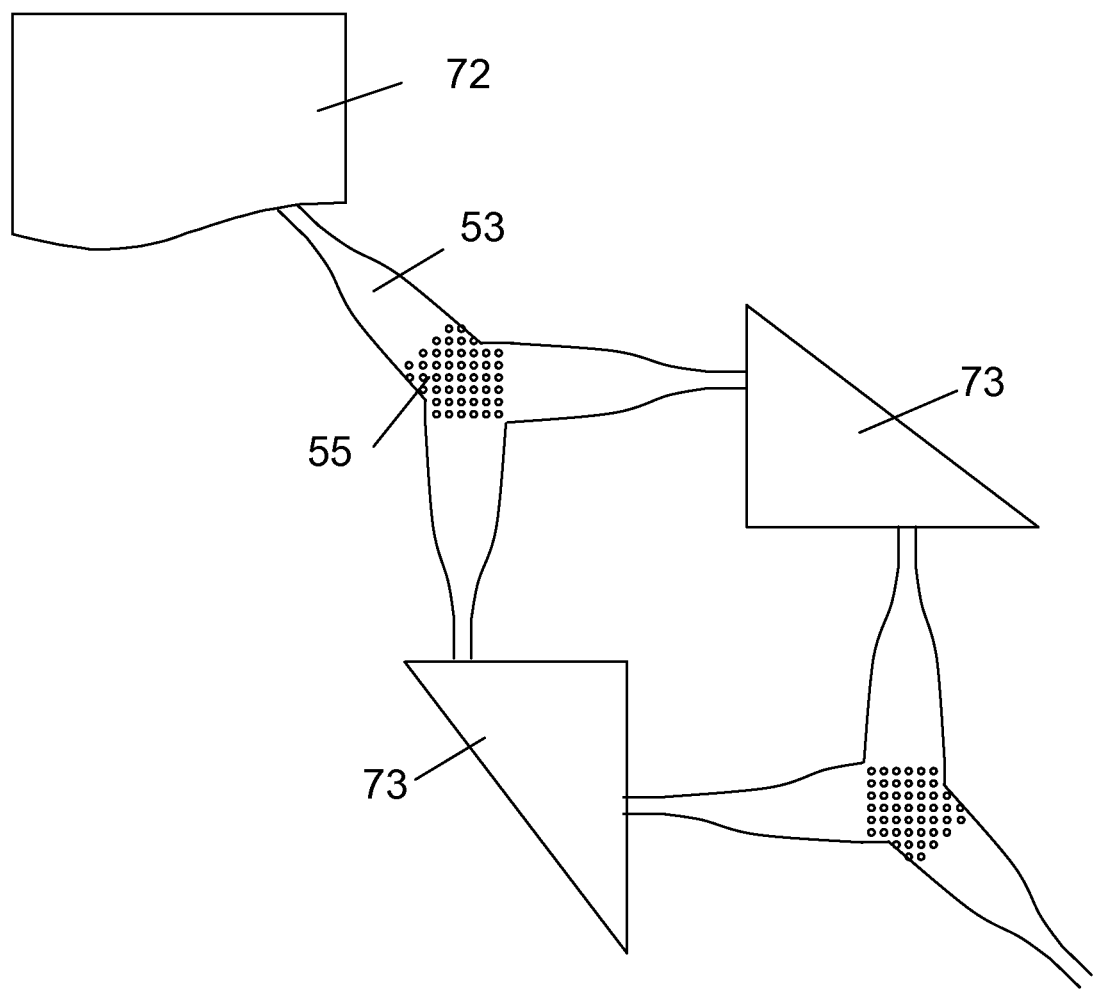

The three-terminal device (FIG. 8) may be used in an analogous way, in which only for a single wavelength or wavelength band a polarization diversity configuration is applied, as shown in FIGS. 10a and 10b. In FIG. 10a, a configuration is shown wherein an optical circuit 72 which is processing or generating the radiation beam with radiation of a wavelength or wavelength band for which no polarization diversity is implemented, is a two-terminal device connecting to the corresponding dielectric waveguides 53 of two identical three-terminal duplexer devices. In FIG. 10b, a configuration is shown wherein the optical circuit 72 which is processing or generating the radiation beam with radiation of a wavelength or wavelength band for which no polarization diversity is implemented, is a one-terminal device connecting to the dielectric waveguide 53 of one of the identical three-terminal duplexer devices. In this case, the third dielectric waveguide 53 of the other duplexer device remains unconnected.

While the above embodiments were explicitly discussed, the scope of the current invention is not limited to these configurations. Other configurations, for example configurations comprising a combination of different embodiments of the multiplexer waveguide couplers according to the present invention may be envisaged. For example, a configuration similar to the one shown in FIG. 6 may be used for multiplexing four radiation beams comprising radiation of four substantially different wavelengths or wavelength bands, by using a suitable diffraction grating structure, e.g. a 2D diffraction grating structure. In such a configuration the four different radiation beams may be demultiplexed into four different dielectric waveguides for a single polarization mode, or vice versa, four different radiation beams traveling in four different dielectric waveguides may be multiplexed into one optical coupling element, e.g. optical fiber. However, in such a configuration the advantage of polarization diversity in a 2D grating structure is not applicable. Still other configurations are possible, such as for example a configuration comprising six dielectric waveguides, wherein four radiation beams comprising radiation of four substantially different wavelengths or wavelength bands are multiplexed, two of which with polarization diversity (i.e. splitting into two orthogonally polarized modes) and the other two for a single polarization mode.

Figure 11:
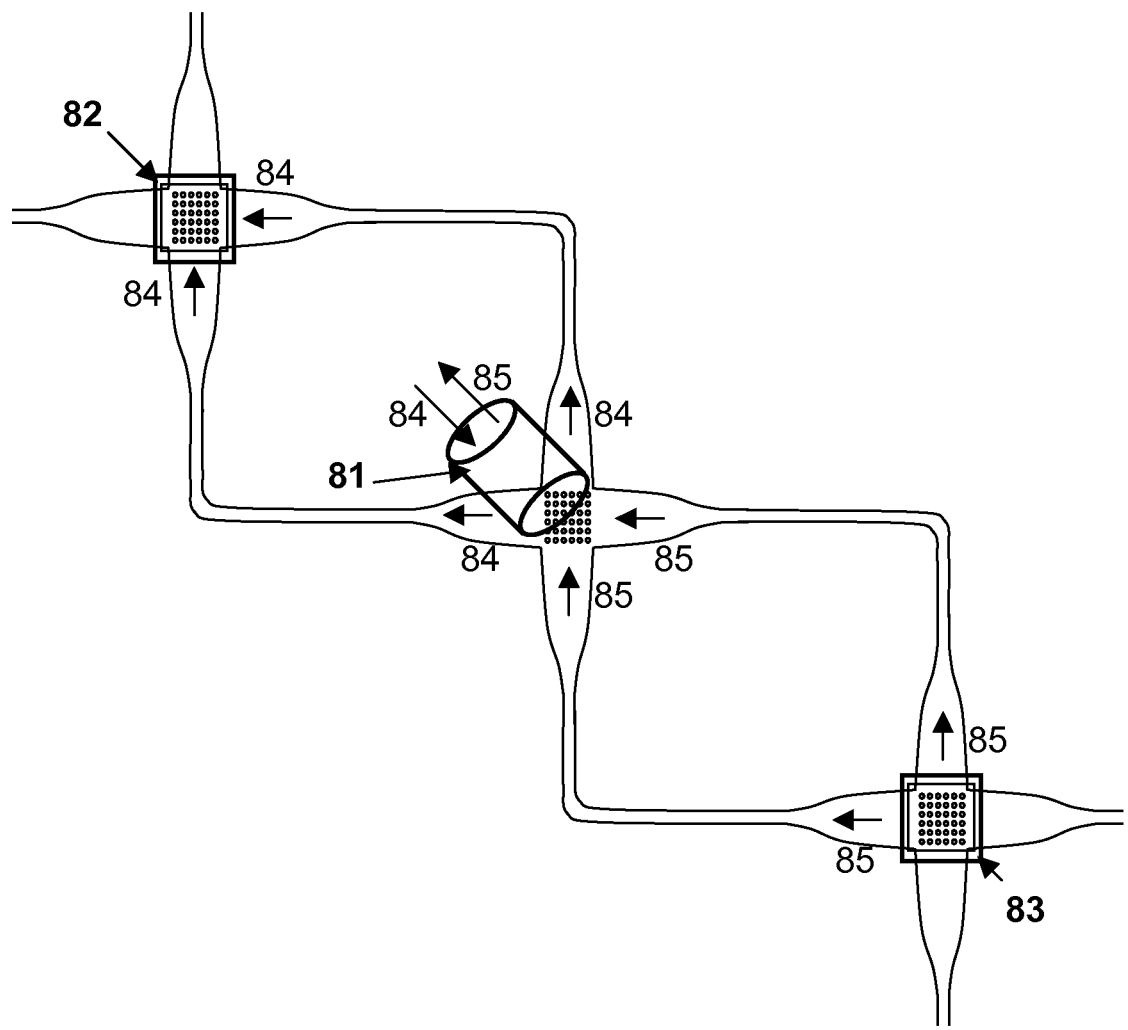
FIG. 11 illustrates the use of an optical device according to embodiments of the present invention in an integrated circuit performing a transceiver operation.
Figure 12:
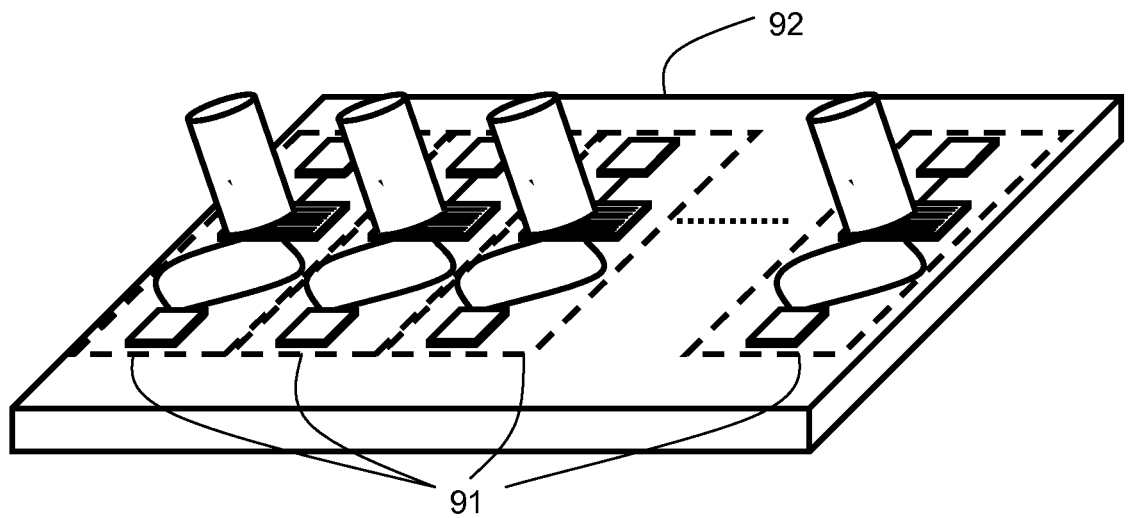
FIG. 12 shows an array of optical transceivers integrated on a single platform according to embodiment of the present invention.

While in the previous discussion, the use of the multiplexer waveguide couplers according to embodiments of the present invention is focused on the physical abutment of a single mode fiber to the diffraction grating structure, the use of these structures may be extended, by replacing one or both optical fibers by an integrated optical device, such as e.g. a light source or a photodetector. This allows amongst others using the optical devices according to embodiments of the present invention in integrated optical circuits performing a transmitter operation, receiver operation or transceiver operation, in which e.g. a downstream optical signal is processed and detected by the optical circuit and/or an upstream optical signal is generated on the integrated circuit and coupled to an optical fiber, e.g. the same optical fiber carrying the downstream optical signals. This is illustrated in FIG. 11, showing a configuration in which a downstream optical signal 84 is processed and detected by a photodetector 82 on the integrated optical circuit, while an upstream optical signal 85 is generated on the integrated optical circuit, for example by a surface-emitting laser or a light-emitting diode 83 and coupled to the same optical fiber 81 carrying the downstream optical signals. An array of such optical transceivers 91 may be integrated on a single platform 92, as schematically shown in FIG. 12.

Although this is an important class of devices, especially for data-communication applications such as Fiber-To-The-Home optical networks, the use of integrated opto-electronic devices in conjunction with the duplexer waveguide couplers and optical fibers is not limited to this application.

A method for optical multiplexing or demultiplexing in accordance with embodiments of the present invention may comprise providing at least one first dielectric waveguide 11, 41, 42, 51, 52 and at least one second dielectric waveguide 12, 43, 44, 53 on a substrate 10, the at least one first waveguide and the at least one second dielectric waveguide intersecting at an intersection, and providing a diffraction grating structure 13, 45, 55 at the intersection, wherein the diffraction grating structure is adapted for diffracting light of a first predetermined wavelength form the at least one first dielectric waveguide in an coupling direction and for diffracting light of a second predetermined wavelength from the at least one second dielectric waveguide in substantially the same direction. The coupling direction thereby is substantially different from the surface normal to the average plane defined by the diffracting grating structure. The difference between the first predetermined wavelength and the second predetermined wavelength may be for example in the range between 20 nm and 500 nm. A method for demultiplexing according to embodiments of the present invention may comprise coupling from a coupling direction an optical signal, for example an optical signal comprising two radiation beams comprising radiation of the first wavelength and radiation of the second wavelength, to the diffraction grating structure and diffracting radiation of the first predetermined wavelength and radiation of the second predetermined wavelength at the diffraction grating structure. In this case the method comprises splitting the optical signal, whereby the radiation of the first wavelength is coupled into the first dielectric waveguide 11, 41, 42, 51, 52 and whereby the radiation of the second wavelength is coupled into the second dielectric waveguide 12, 43, 44, 53. A method for optical multiplexing in accordance with embodiments of the present invention may comprise coupling a first radiation beam comprising radiation of the first wavelength traveling in a first dielectric waveguide 11, 41, 42, 51, 52 to the diffraction grating structure 13, 45, 55, and coupling a second radiation beam comprising radiation of the second wavelength traveling in a second dielectric waveguide 12, 43, 44, 53 to the same diffraction grating structure 13, 45, 55, whereby both radiation beams are diffracted into the same coupling direction, e.g. into an optical fiber 21, 81 or an optical element 82, 83.

In embodiments of the present invention, the optical signal may comprise various optical wavelengths having a first polarization mode, e.g. (quasi) TE and a second polarization mode, e.g. (quasi) TM. A method for optical multiplexing or demultiplexing in accordance with embodiments of the present invention may then comprise coupling the optical signal to a multiplexer waveguide coupler in the three-terminal or four-terminal device configuration as described above. In the four-terminal device configuration, the method comprises splitting the optical signal into the four optical dielectric waveguides 41, 42, 43, 44, whereby the orthogonally polarized modes are split in two sets of optical dielectric waveguides forming a substantially right angle, each set carrying optical power around a different wavelength or wavelength band. The radiation may e.g. propagate as (quasi) TE polarization mode in both dielectric waveguides of the set or as (quasi) TM polarization mode in both dielectric waveguides of the set. In the three-terminal device configuration, the method comprises splitting the optical signal into the three optical dielectric waveguides 51, 52, 53, while the orthogonally polarized modes around one wavelength band are split into the set of optical dielectric waveguides 51, 52 forming a substantial right angle, in which they propagate as either (quasi) TE mode or as (quasi) TM mode, while this set of dielectric waveguides 51, 52 and the third optical dielectric waveguide 53 carry optical power around a different wavelength band.

Figure 13:
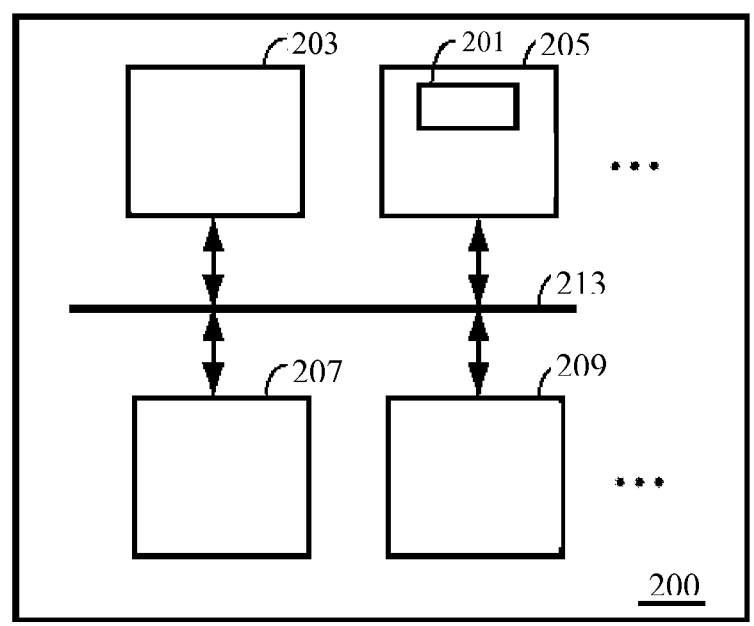
FIG. 13 shows a processing system as can be used for methods for designing optical devices according to embodiments of the present invention.

The above-described design method embodiments of the present invention for designing an optical device for optically multiplexing or demultiplexing light of substantially different predetermined wavelengths may be implemented in a processing system 200 such as shown in FIG. 13. FIG. 13 shows one configuration of processing system 200 that includes at least one programmable processor 203 coupled to a memory subsystem 205 that includes at least one form of memory, e.g., RAM, ROM, and so forth. It is to be noted that the processor 203 or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. The processing system may include a storage subsystem 207 that has at least one disk drive and/or CD-ROM drive and/or DVD drive. In some implementations, a display system, a keyboard, and a pointing device may be included as part of a user interface subsystem 209 to provide for a user to manually input information. Ports for inputting and outputting data also may be included. More elements such as network connections, interfaces to various devices, and so forth, may be included, but are not illustrated in FIG. 13. The various elements of the processing system 200 may be coupled in various ways, including via a bus subsystem 213 shown in FIG. 13 for simplicity as a single bus, but will be understood to those in the art to include a system of at least one bus. The memory of the memory subsystem 205 may at some time hold part or all (in either case shown as 211) of a set of instructions that when executed on the processing system 200 implement the steps of the method embodiments described herein. Thus, while a processing system 200 such as shown in FIG. 13 is prior art, a system that includes the instructions to implement aspects of the methods for designing optical devices according to embodiments of the present invention is not prior art, and therefore FIG. 13 is not labelled as prior art.

The present invention also includes a computer program product which provides the functionality of any of the methods according to the present invention when executed on a computing device. Such computer program product can be tangibly embodied in a carrier medium carrying machine-readable code for execution by a programmable processor. The present invention thus relates to a carrier medium carrying a computer program product that, when executed on computing means, provides instructions for executing any of the design methods for optical devices as described above. The term "carrier medium" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

The invention claimed is:

1. An optical device comprising:
   a first waveguide pair that includes a first dielectric waveguide formed on a substrate and a second dielectric waveguide formed on the substrate;
   a second waveguide pair that includes a third dielectric waveguide formed on the substrate and a fourth dielectric waveguide formed on the substrate, wherein the first waveguide pair and the second waveguide pair intersect at an intersection; and
   a diffraction grating structure formed at the intersection and configured to couple in and couple out light of a first predetermined wavelength and light of a second predetermined wavelength at substantially a same time, wherein:
   the diffraction grating structure is adapted for diffracting light of the first predetermined wavelength from the first waveguide pair in a coupling direction;
   the diffraction grating structure is adapted for diffracting light of the second predetermined wavelength to the second waveguide pair to substantially the coupling direction;
   the coupling direction depends on the first predetermined wavelength and the second predetermined wavelength, and is substantially different from a normal direction on an average plane defined by the diffraction grating structure; and
   the first predetermined wavelength and the second predetermined wavelength are substantially different.

2. The optical device according to claim 1, wherein the diffraction grating structure is adapted to couple out light in the coupling direction by having at least one of a predetermined grating period, a predetermined grating depth, a predetermined grating layer thickness, and a predetermined grating duty cycle.

3. The optical device according to claim 1, further comprising:
an optical coupling element coupled with the intersection, the optical coupling element providing at least an optical path in the coupling direction such that light of the first predetermined wavelength is coupled between the first waveguide pair and the optical coupling element, and such that light of the second predetermined wavelength is coupled between the second waveguide pair and the optical coupling element.

4. The optical device according to claim 3, wherein the optical coupling element comprises an optical dielectric waveguide.

5. The optical device according to claim 3, wherein the optical coupling element is coupled with the intersection by a physical abutment.

6. The optical device according to claim 1, wherein the diffraction grating structure is further configured to combine light of the first predetermined wavelength having two orthogonally polarized modes by combining a first optical polarization mode from the first dielectric waveguide and a second optical polarization mode from the second dielectric waveguide.

7. The optical device according to claim 1, wherein the diffraction grating structure is further configured to simultaneously split the light of the second predetermined wavelength into two orthogonally polarized modes, wherein a first optical polarization mode is coupled to the third dielectric waveguide and a second optical polarization mode is coupled to the fourth dielectric waveguide.

8. The optical device according to claim 1, wherein the diffraction grating structure is a two-dimensional grating structure.

9. The optical device according to claim 1, wherein the first dielectric waveguide, the second dielectric waveguide, the third dielectric waveguide, and the fourth dielectric waveguide are selected from a group consisting of channel waveguides, slab waveguides, ridge waveguides and strip loaded waveguides.

10. The optical device according to claim 1, wherein at least one of the first dielectric waveguide, the second dielectric waveguide, the third dielectric waveguide, and the fourth dielectric waveguide is adapted for supporting TE polarized light or quasi TE polarized light.

11. The optical device according to claim 1, wherein the diffraction grating structure is one of a periodic grating structure or a non-periodic grating structure.

12. The optical device according to claim 1, wherein the diffraction grating structure is one of a periodic grating structure or a non-periodic grating structure, and is made of a pattern of elliptically shaped structures.

13. The optical device according to claim 1, wherein the substrate comprises an additional stack of layers forming a substrate reflector under the diffraction grating structure.

14. The optical device according to claim 1, wherein:
the first waveguide pair comprises a first lateral spot-size converter; and
the second waveguide pair comprises a second lateral spot-size converter, wherein the first lateral spot-size converter and the second lateral spot-size converter couple the optical device to one or more integrated optical circuits.

15. The optical device according to claim 1, wherein:
the first predetermined wavelength is between 1250 nm and 1350 nm, and
the second predetermined wavelength is between 1455 nm and 1605 nm.

16. The optical device according to claim 1, wherein the optical device is used in local access communications.

17. A method comprising:
providing a first dielectric waveguide pair on a substrate that includes a first dielectric waveguide and a second dielectric waveguide;
providing a second dielectric waveguide pair on the substrate that includes a third dielectric waveguide and a fourth dielectric waveguide, wherein the first dielectric waveguide pair and the second dielectric waveguide pair intersect at an intersection;
providing a diffraction grating structure at the intersection;
diffracting light of a first predetermined wavelength at the diffraction grating structure; and
at substantially a same time, diffracting light of a second predetermined wavelength at the diffraction grating structure, wherein the second predetermined wavelength is substantially different from the first predetermined wavelength, and wherein:
the diffraction grating structure is adapted for diffracting light of the first predetermined wavelength from the first dielectric waveguide pair in a coupling direction; and
the diffraction grating structure is adapted for diffracting light of the second predetermined wavelength to the second dielectric waveguide pair from in substantially the coupling direction; and
the coupling direction depends on the first predetermined wavelength and the second predetermined wavelength and is substantially different from the normal direction on an average plane defined by the diffraction grating structure.

18. The method according to claim 17, wherein the diffraction grating structure is adapted for coupling out light in the coupling direction by adapting at least one of a grating period of the diffraction grating structure, a grating depth of the diffraction grating structure, a grating layer thickness, and a grating duty cycle of the diffraction grating structure.

19. The method according to claim 17, further comprising coupling an optical coupling element with the intersection, the optical coupling element providing at least an optical path in the coupling direction.

20. The method according to claim 17, wherein two of first dielectric waveguide, the second dielectric waveguide, the third dielectric waveguide, and the fourth dielectric waveguide intersect substantially under a straight angle.

21. The method according to claim 17, wherein the diffraction grating structure is further configured to combine light of the first predetermined wavelength having two orthogonally polarized modes by combining a first optical polarization mode from the first dielectric waveguide and a second optical polarization mode from the second dielectric waveguide.

22. The method according to claim 17, wherein the diffraction grating structure is further configured to simultaneously split the light of the second predetermined wavelength into two orthogonally polarized modes, wherein a first optical polarization mode is coupled to the third dielectric waveguide and a second optical polarization mode is coupled to the fourth dielectric waveguide.

* * * * *

UNITED STATES PATENT AND TRADEMARK OFFICE
CERTIFICATE OF CORRECTION

PATENT NO.       : 8,594,503 B2                                         Page 1 of 1
APPLICATION NO. : 12/594488
DATED            : November 26, 2013
INVENTOR(S)      : Roelkens et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 629 days.

Signed and Sealed this

Twenty-second Day of September, 2015

Michelle K. Lee
*Director of the United States Patent and Trademark Office*